United States Patent
Cantin et al.

(10) Patent No.: US 8,878,494 B2
(45) Date of Patent: Nov. 4, 2014

(54) CIRCUIT FOR PROTECTING A THIN-LAYER BATTERY

(75) Inventors: Frédéric Cantin, Tours (FR); Nicolas Debeaupte, Tours (FR)

(73) Assignee: STMicroelectronics (Tours) SAS, Tours (FR)

( * ) Notice: Subject to any disclaimer, the term of this patent is extended or adjusted under 35 U.S.C. 154(b) by 534 days.

(21) Appl. No.: 13/303,925

(22) Filed: Nov. 23, 2011

(65) Prior Publication Data

US 2012/0169292 A1 Jul. 5, 2012

(30) Foreign Application Priority Data

Dec. 31, 2010 (FR) ...................................... 10 61390

(51) Int. Cl.
| | | |
|---|---|---|
| *H01M 10/44* | (2006.01) | |
| *H01M 10/46* | (2006.01) | |
| *H02H 7/18* | (2006.01) | |
| *H02J 7/00* | (2006.01) | |
| *H02H 3/24* | (2006.01) | |

(52) U.S. Cl.
CPC . *H02H 7/18* (2013.01); *H02H 3/24* (2013.01); *H02J 7/0031* (2013.01)
USPC .......................................... 320/136; 320/135

(58) Field of Classification Search
CPC ...................................................... H02J 7/0031
USPC .......................................................... 320/136
See application file for complete search history.

(56) References Cited

U.S. PATENT DOCUMENTS

| | | | | |
|---|---|---|---|---|
| 6,157,169 | A * | 12/2000 | Lee ................................. | 320/132 |
| 6,166,522 | A * | 12/2000 | Patino et al. .................. | 320/127 |
| 6,340,880 | B1 * | 1/2002 | Higashijima et al. ......... | 320/162 |
| 7,586,292 | B1 | 9/2009 | Wakefield et al. | |
| 8,264,205 | B2 * | 9/2012 | Kopera ......................... | 320/136 |
| 2004/0017199 | A1 | 1/2004 | Kawakami | |
| 2006/0132093 | A1 | 6/2006 | Nguyen | |
| 2010/0194346 | A1 * | 8/2010 | Lee et al. ...................... | 320/134 |

* cited by examiner

*Primary Examiner* — Edward Tso
*Assistant Examiner* — Jerry D Robbins
(74) *Attorney, Agent, or Firm* — Slater & Matsil, L.L.P.

(57) ABSTRACT

A method for protecting a thin-layer battery, including the steps of: periodically operating the battery at a forced discharge current, which is a function of temperature; and disconnecting the battery as soon as the voltage across it reaches a threshold, said threshold being greater than its critical voltage for a maximum discharge current under a maximum temperature.

21 Claims, 3 Drawing Sheets

US 8,878,494 B2

CIRCUIT FOR PROTECTING A THIN-LAYER BATTERY

CROSS-REFERENCE TO RELATED APPLICATIONS

This application claims the priority benefit of French Patent Application Number 10/61390, filed Dec. 31, 2010, entitled "Circuit for Protecting a Thin-Layer Battery," which is hereby incorporated by reference to the maximum extent allowable by law.

TECHNICAL FIELD

The present invention generally relates to electronic systems and, more specifically, to a system for protecting a thin-layer battery.

BACKGROUND

Thin-layer batteries, for example, batteries with a LiPON electrolyte and a lithium-metal anode, are increasingly used in the electronics industry. The voltage across a battery of this type decreases along its operation to reach a critical voltage below which the battery is irreversibly damaged. Circuits using such batteries are thus generally equipped with a protection system stopping the battery discharge before it reaches this critical voltage. Such systems usually detect the moment when the battery voltage approaches its critical voltage to disconnect the battery from the load.

However, this critical voltage depends on the current pulled from the battery, which usually makes it necessary to size the protection system to the worst case, that is, to the highest critical voltage. Such a sizing adversely affects the performance and especially tends to disconnect the battery even when this is not necessary.

Further, the internal resistance of the battery varies according to temperature, which further complicates the problems, as will be discussed hereafter.

Such problems are particularly present in systems with an intermittent operation, for example, batteries powering self-contained sensors which periodically communicate data (regularly or not). In such systems, very short active periods alternate with inactive periods, which may be long.

SUMMARY OF THE INVENTION

In one aspect, embodiments of the present invention provide for a method for protecting a thin-layer battery. The method includes periodically operating the battery at a forced discharge current, which is a function of temperature, and disconnecting the battery as soon as the voltage thereacross reaches a threshold, the threshold being greater than a critical voltage of the batter at a maximum discharge current under a maximum temperature.

In another aspect, embodiments of the present invention provide for a device for protecting a thin-layer battery, comprising a switchable load capable of periodically forcing the battery to operate at a forced discharge current, the forced discharge current being temperature-dependent. The device further includes a voltage comparator capable of comparing the voltage across the battery with a threshold, this threshold being greater than a critical voltage of the battery at a maximum discharge current under a maximum temperature.

The foregoing and other objects, features, and advantages will be discussed in detail in the following non-limiting description of specific embodiments in connection with the accompanying drawings.

DETAILED DESCRIPTION OF ILLUSTRATIVE EMBODIMENTS

Figure 1:
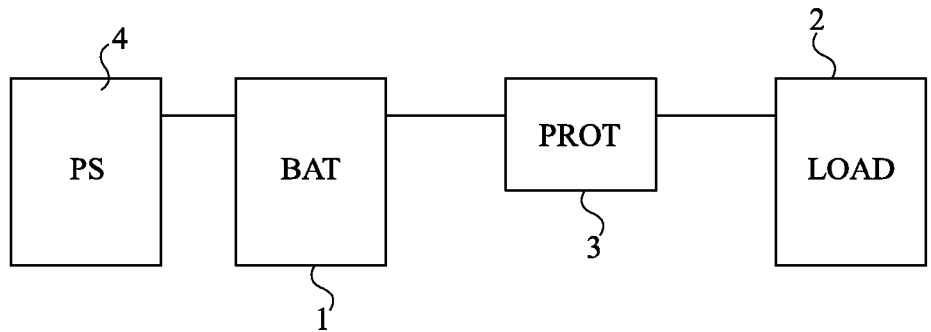
FIG. 1 is a block diagram of an electronic system of the type to which the embodiments which will be described apply as an example.

Before addressing the illustrative embodiments in detail, various embodiments and advantageous features thereof will be discussed generally. An embodiment provides a device for protecting a thin-layer battery which overcomes all or part of the disadvantages of usual devices. Another embodiment provides a protection device which improves the use of the charge of the battery without for all this increasing its risk of destruction. Yet another embodiment provides a low-consumption device.

One embodiment provides a method for protecting a thin-layer battery, comprising the steps of periodically operating the battery at a forced discharge current, which is a function of temperature, and disconnecting the battery as soon as the voltage thereacross reaches a threshold, said threshold being greater than a critical voltage of the battery at a maximum discharge current under a maximum temperature.

According to an embodiment, the forced discharge current increases when the temperature increases. According to another embodiment, the periodic operation has a duty cycle smaller than 0.1%. According to yet another embodiment, the duration of each phase of forced operation is shorter than 50 ms. According to still another embodiment, the period of the periodic operation is shorter than 10 minutes.

Another embodiment provides a device for protecting a thin-layer battery, comprising a switchable load capable of periodically forcing the battery to operate at a forced discharge current, the force discharge current being temperature-dependent. The device further includes a voltage comparator capable of comparing the voltage across the battery with a threshold, this threshold being greater than a critical voltage of the battery for a maximum discharge current under a maximum temperature.

According to some embodiments, the switchable load is formed of a current source comprising at least one first resistive element with a negative temperature coefficient.

In some embodiments the current source comprises a first branch having a first bipolar transistor in series with a second resistive element, a second branch having a second diode-assembled bipolar transistor, in series with a third resistive element, the second transistor being minor-assembled on the first one and the first resistive element connecting the control terminals of the transistors to a terminal of application of a control signal. According to an embodiment, the comparator is a hysteresis comparator.

In the attached figures, the same elements have been designated with the same reference numerals in the different drawings. For clarity, only those elements which are useful to the understanding of the present disclosure have been shown and will be described. In particular, the load powered by the battery has not been detailed, the present invention being compatible with any load currently powered by a thin-layer battery and especially any load with an intermittent operation. Further, the battery recharge devices have not been detailed either, the present invention being here again compatible with recharge devices currently used in this type of application.

FIG. 1 is a simplified representation of an embodiment of an electronic system using a thin-layer battery 1 (BAT). Such a system comprises one or several electronic circuits 2 (LOAD) forming the load powered by the battery and, it being a thin-layer battery 1, a device 3 for protecting (PROT) battery 1. Further, the system may also comprise a device 4 (PS) for supplying the battery with power for its recharge. Such a device 4 is formed, for example, of solar, wind, or heat collectors and, more generally, of any battery recharge system, for example, a transformer device intended to be connected to the electric distribution mains. Protection device 3 is used to disconnect battery 1 when its discharge is such that it risks reaching a critical voltage below which it is irreversibly damaged.

Figure 2:
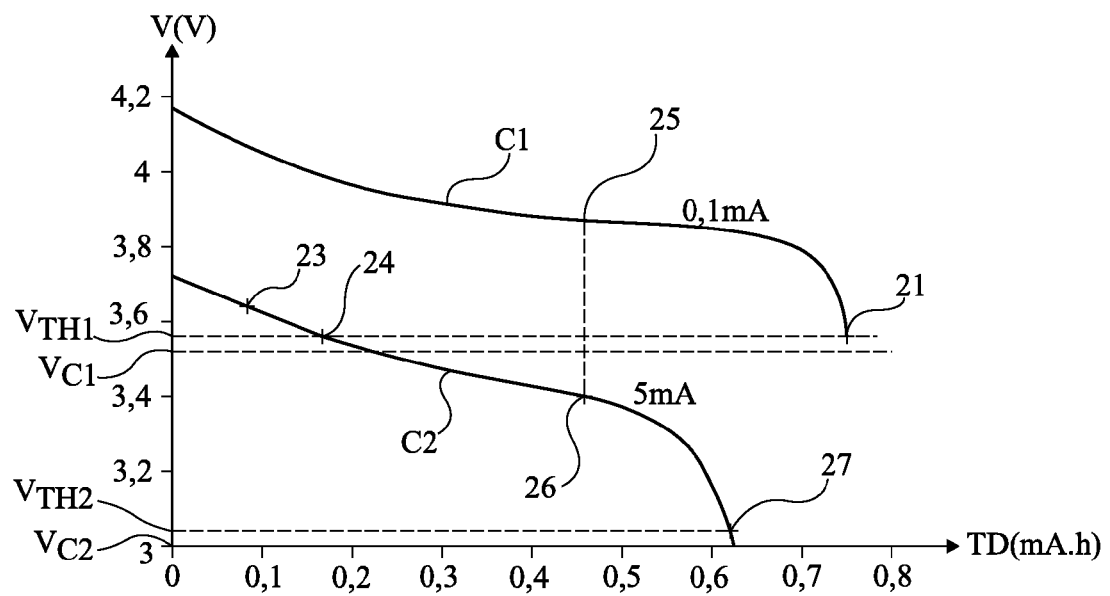
FIG. 2 is a diagram showing the voltage across a battery according to its discharge rate for two discharge current values.

FIG. 2 is a diagram showing an example of the shape of voltage V across a battery 1, for example, lithium-ion, according to its discharge rate TD (in milliamperes-hour—mA.h) for two discharge current values, respectively 0.1 and 5 milliamperes. The discharge rate is zero when the battery is fully charged. It increases along the battery operation and must never reach a maximum value, to avoid irreversibly damaging the battery. For a 0.1-milliampere discharge current, the voltage decreases from an initial 4.2-volt voltage to a critical 3.6-volt voltage $V_{C1}$. For a 5-milliampere discharge current, the voltage decreases from an initial 3.75-volt voltage to a critical 3-volt voltage $V_{C2}$.

Thus, when battery 1 is connected to a load with a current surge varying from 0.1 milliampere to 5 milliamperes, the operating point follows curve C1 in inactive periods of the load and follows curve C2 in active periods of the load. Given that the battery may have long inactive periods, it is possible for the operating point to constantly move along curve C1 all the way to point 21 of this curve, corresponding to a voltage $V_{TH1}$ slightly greater than voltage $V_{C1}$. To avoid the battery entering an irreversibly damaged state, current protection devices disconnect said battery as soon as point 21 has been reached, by permanently comparing the voltage across the battery with a threshold voltage $V_{TH1}$ slightly greater than value $V_{C1}$.

This choice of a threshold $V_{TH1}$ slightly greater than $V_{C1}$ has a major disadvantage for the battery when operating at its maximum discharge current. If, in active periods of the load, the battery discharges from a point 23 of curve C2, as soon as a point 24 corresponding to the point where voltage $V_{TH1}$ is reached, the battery is disconnected. Similarly, if the battery is at an operating point 25 of curve C1 and the load causes a current surge which should shift the operating point to point 26 of curve C2, the battery is disconnected since the voltage thereacross, for point 6, would be lower than $V_{TH1}$. Thus, for an operation at maximum current, the battery is disconnected at the level of point 24 while is still contains a large power capacity. Point 27 of curve C2 corresponding to a voltage $V_{TH2}$ slightly greater than critical voltage $V_2$ can never be reached for this operating mode.

The operation illustrated in FIG. 2 shows the variation of the internal resistance of the battery according to its available load. This resistance strongly increases at the end of the battery capacity.

Further, the internal resistance of the battery also strongly varies according to the operating temperature. As an example, a battery in a LiPON electrolyte technology may have an internal resistance which passes from several thousands of ohms for a temperature on the order of −20° C. to a few ohms for a temperature of some fifty degrees Celsius.

Figure 3:
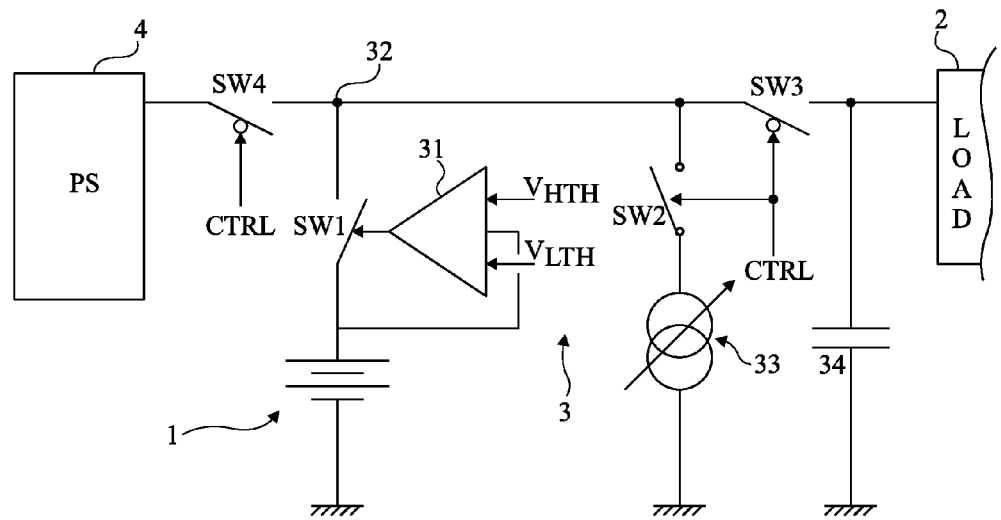
FIG. 3 shows an embodiment of a device for protecting a battery powering a load.

FIG. 3 functionally shows an embodiment of a device 3 for protecting a battery 1 powering an intermittent load 2 and associated with an optional recharge device 4.

A voltage comparator 31 compares the voltage across the battery with a threshold $V_{TH}$. In practice, comparator 31 is a hysteresis comparator, which is illustrated in FIG. 3 by two respective high $V_{HTH}$ and low $V_{LTH}$ thresholds surrounding a minimum threshold $V_{TH}$ (the high and low character of the thresholds being relative with respect to each other). An output of comparator 31 is connected to a control terminal of a switch SW1 having a first terminal connected to battery 1 and having a second terminal connected to a node 32. Node 32 is connected, by a switch SW2, to a pulse generator of variable amplitude 33 and, by switches SW3 and SW4, respectively to load 2 and to charger 4. A buffer capacitor 34 further grounds the terminal of switch SW3 on the side of load 2.

The assembly illustrated in FIG. 3 is provided to operate according to one or the other of two modes. These two modes follow each other periodically until the possible disconnection of battery 1 if it is excessively discharged.

In the example of FIG. 3, it is assumed that the battery charger is permanently connected, via switch SW4, to said battery and that it does not permanently provide power, since it is, for example, of solar, vibration, wind, or heat collector type. In this case, the operation of switch SW4 is similar to that of switch SW3. In another situation where the charger is intended to be connected to the electric power supply network, switch SW4 symbolizes the connection of the charger.

In a first operating mode, switches SW1, SW3, and SW4 are on and switch SW2 is off. In an inactive period of load 2, battery 1 briefly charges buffer capacitor 34 and then powers the load (for example, a microcontroller) under a low current (in the example of FIG. 2, a 0.1-milliampere current). In an active period of load 2, battery 1 and buffer capacitor 34 power load 2 (for example, a radio transmission circuit), capacitor 34 being sized to provide most of the peak current to the load and to limit the current peak required from the battery (5 milliamperes in the example of FIG. 2).

In a second so-called forced operation mode, switches SW1 and SW2 are on while switches SW3 and SW4 are off. Switchable pulse load 33 forces the battery to operate at its maximum discharge current. Load 2 remains powered by the buffer capacitor 34 during this period of forced operation of the battery.

In a battery protection mode, switch SW1 is turned off under the effect of comparator 31. Switch SW4 remains on to power the load, switch SW3 being also on. Switch SW1 remains off as long as power source 4 does not provide a sufficient power to power the load and recharge the battery at the same time (as long as the power source has not reached threshold $V_{HTH}$).

Figure 4:
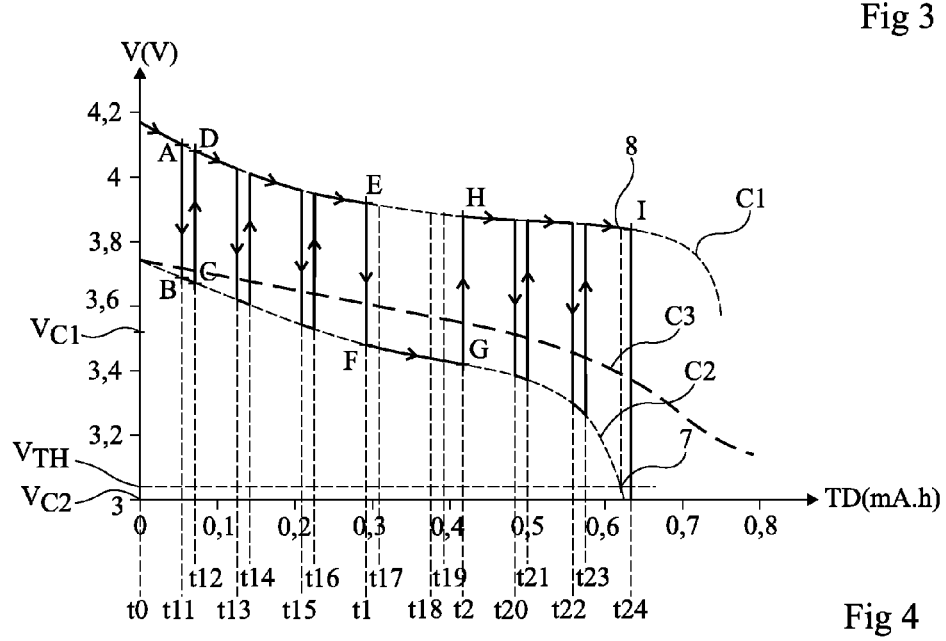
FIG. 4 is a diagram similar to that of FIG. 2 illustrating an operating mode of the device of FIG. 3.

FIG. 4 is a diagram similar to that in FIG. 2, which illustrates the variation of the voltage across a battery connected in an assembly of the type of that in FIG. 3. To simplify the description, it is assumed for the time being that the internal resistance of the battery is temperature-stable and only varies according to the residual charge of the battery.

At an initial time t0, battery 1 is fully charged and the voltage thereacross is 4.2 volts, assuming that load 2 is not active. Switches SW1 and SW3 are on (as well as, possibly, switch SW4), switch SW2 is off. Capacitor 34 charges and the voltage across battery 1 decreases along curve C1.

At a time t11, switch SW2 is turned on for a short time while switches SW3 and SW4 are turned off. Switch SW1 remains on. Load 33 then forces battery 1 to operate at 5 milliamperes. The voltage across battery 1 drops vertically from point A of curve C1 to point B of curve C2. It is then shifted along curve C2 from point B to point C corresponding to a time t12. At time t12, switch SW2 is turned off and switch SW3, as well as switch SW4, are turned back on. Assuming that load 2 is inactive, the value of the discharge current of battery 1 varies from 5 mA to 0.1 mA, from point C of curve C2 to point D of curve C1.

This short round trip of the voltage across the battery between curves C1 and C2 is periodically repeated. Thus, the same operation as at time t11 occurs at times t13 and t15. Time intervals t11 to t12, t13 to t14, and t15 to t16, during which load 2 forces the operation of battery 1 to a 5-milliampere discharge current are short and preferably equal. "Brief" means sufficiently short for the load to be able to be powered by buffer capacitor 34 in case of need. As a variation, the risk for load 2 to possibly fall short of power during these periods is accepted.

In FIG. 4, a stable operating temperature resulting in a forced discharge current of 5 milliamperes is assumed. However, as will be seen hereafter, the variable load (33, FIG. 3) imposes a forced discharge current which depends on the operating temperature.

At a time t1, load 2 is assumed to start being active. The current provided by battery 1 increases from 0.1 to 5 milliamperes. The operating point shifts from point E of curve C1 to point F of curve C2. The active period of load 2 lasts until time t2. Between times t1 and t2, the current provided by the battery is equal to 5 milliamperes. The operating point shifts from point F to point G of curve C2. At time t2, the current provided by battery 1 decreases from 5 milliamperes to 0.1 milliampere. The operating point shifts from point G to point H of curve C1.

Since load 33 periodically brings battery 1 to a forced operation at a 5-milliampere discharge current, iterations of this forced operation are likely to occur between times t1 and t2. In the shown example, a first iteration substantially occurs at time t1 to end at a time t17, and a second one starts at a time t18 to end at a time t19. Such iterations have no influence upon the power supply of load 2 due to the presence of buffer capacitor 34.

After time t2, load 2 remains inactive, and the battery operating point moves along curve C1 except during the time intervals from t20 to t21 and from t22 to t23. Such time intervals correspond to two forced operation iterations.

At a time t24, a new iteration of the forced operation starts. Battery 1 then attempts to operate at a 5-milliampere discharge current. The operating point cannot pass from a point I of curve C1 to a point of curve C2 without the voltage across the battery becoming lower than a voltage $V_{TH}$ slightly greater than $V_{C2}$. The battery discharge is interrupted by turning off switch SW1 as soon as the voltage across the battery is equal to voltage $V_{TH}$. In practice, with the hysteresis comparator, switch SW1 is turned off when the voltage becomes smaller than threshold $V_{LTH}$ and turns back on when the battery charge reaches $V_{HTH}$. This avoids untimely switchings of switch SW1.

In the example of thin-layer batteries for self-contained sensors, system 4 for collecting power (heat, vibration, radiation, light, etc.) intermittently charges battery 1 (when the power source is available). This system automatically reconnects the battery which is secured at time t24, when the power source is available again and the battery charge becomes sufficient again. This automatic reconnection does not endanger the battery discharged at time t24 since the power supply can only increase its voltage and thus draw it away from threshold $V_{TH}$.

It is thus provided herein to submit a battery to repeated high-current operation iterations and to select, as threshold voltage $V_{LTH}$, a value slightly greater than critical voltage $V_{C2}$ corresponding to an operation with a high current. This choice of a threshold $V_{LTH}$ greater than $V_{C2}$ is very advantageous for the battery when operating at its maximum discharge current. Indeed, the battery is disconnected at operating point 7 only, that is, when all the power available in the battery for a 5-milliampere current has been used.

The periodicity of the forced operation is preferably selected to be short, so that above-mentioned point I is not distant from point 8 of curve C1, located vertically above point 7 of curve C2, and so that point I is very distant from the end point of curve C1 corresponding to the critical voltage at low current. In the example illustrated in FIG. 4, battery 1 can provide a 0.1-milliampere current for more than one hour when the operating point moves along curve C1 from point 8 located vertically above point 7 to the end point of curve C1. This end point does not risk being reached if the periodicity of the forced operation is selected to be much shorter than one hour, for example, on the order of some ten minutes. This periodicity has to be adapted according to the application, to the periods of intermittent operation of the load with respect to its inactive periods, and to the battery type. Further, the forced operation time will be selected to be short to minimize the electric consumption induced by the many iterations of this forced operation.

Buffer capacitor 34, which has the function of powering intermittent load 2 during the forced operation and of limiting the value of the maximum discharge current of the battery during active periods of the intermittent load, may have a capacitance of a few hundreds of microfarads. This buffer capacitor is optional if no iteration of the forced operation coincides with active periods of the intermittent load, and if the current peak surged by the load does not exceed that which can be provided by the sole battery. It may also be replaced with any power source having the same function.

Figure 5:
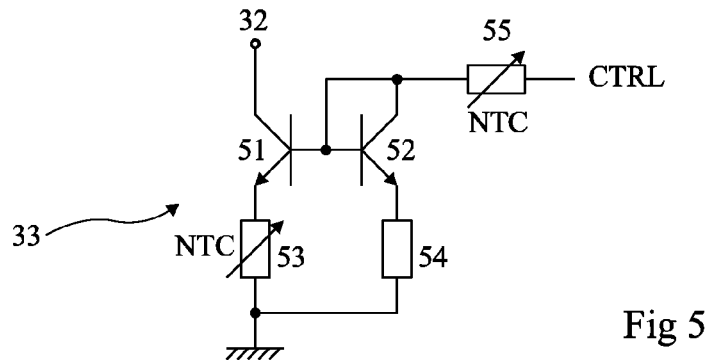
FIG. 5 shows an embodiment of a generator of pulses of variable amplitude of the device of FIG. 3.

FIG. 5 shows the electric diagram of an embodiment of source 33 for generating a variable current. According to this embodiment, this current source is formed of two NPN-type bipolar transistors NPN 51 and 52 assembled as a current mirror, a first transistor 51 having its collector directly connected to terminal 32 and its emitter connected to ground via a resistor 53. Transistor 51 plays the role of switch SW2. A second branch of the current mirror is formed by second bipolar transistor 52 assembled as a diode (base and collector connected) and having its emitter connected to ground by a resistor 54. The bases of transistors 51 and 52 receive control signal CTRL via a resistive element 55. As a variation, a technology based on MOS transistors may be used.

The present inventors have observed that the internal resistance of a thin-layer battery has a temperature variation shape similar to that of a resistor of negative temperature coefficient. Thus, resistive element 55 is a negative temperature coefficient resistor (NTC) which sets the current in the branch of transistor 52 of circuit 33. When the temperature increases, the value of this resistance decreases, which generates a current increase in the minor and, accordingly, an increase in the current pulled by transistor 51.

According to a more preferred embodiment still, resistive elements 53 in series with transistor 51 also is a negative temperature coefficient resistor (NTC). This further improves the behavior of generator 33. The decrease in the value of resistor 53 by temperature increase has an effect in accordance with that of resistor 55.

The amplitude modulation of the current pulled by source 33 translates as an amplitude modulation of the current of the high-current pulses. In the diagram of FIG. 4, this translates as the fact that these pulses place the temporary operating point on another curve than curve C2. Assuming that curve C2 corresponds to an operation at maximum temperature (for example, 60° C.), an operation at lower temperature (for example, 25° C.) places the operating points on a curve C3 having the same origin as curve C2, but with a less abrupt slope. As a result, the forced discharge current during pulses is lower.

Figure 6:
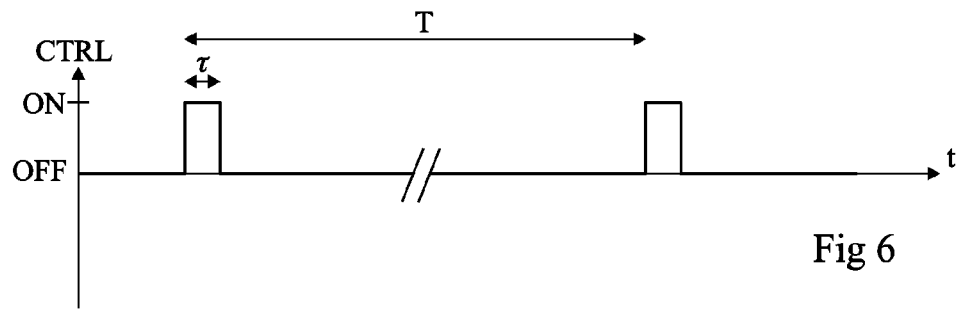
FIG. 6 illustrates an example of the shape of a signal for controlling the generator of FIG. 5.

FIG. 6 is a timing diagram illustrating an example of the shape of control signal CTRL. This signal comprises pulses of short duration t (less than one second, preferably less than 50 milliseconds), spaced apart by a relatively long duration T (for example, several tens of minutes, preferably shorter than 10 minutes) as compared with the duration of a pulse. According to a preferred embodiment, the ratio of duration τ of a pulse to duration T (periodic operation duty cycle in forced state) is smaller than 0.1%.

Each pulse τ may be formed of a train of several pulses of even shorter duration. Duration τ and the duration of such possible shorter pulses are set, for example, by a microcontroller or an analog circuit, powered by the battery voltage, that is, belonging to load 2.

The selection of resistor 55 and optionally of resistor 53 depends on the type of connected battery and on the temperature-behavior of its internal resistance. In practice, threshold $V_{LTH}$ will be selected so that in all circumstances, the overvoltage created by the current pulse through the internal resistor of the battery is smaller than the difference between thresholds $V_{TH1}$ (corresponding to the minimum current pulled from the battery) and $V_{LTH}$.

The protection device of the above-described embodiments has the advantage of a low consumption, compatible with a low operating temperature.

Figure 7:
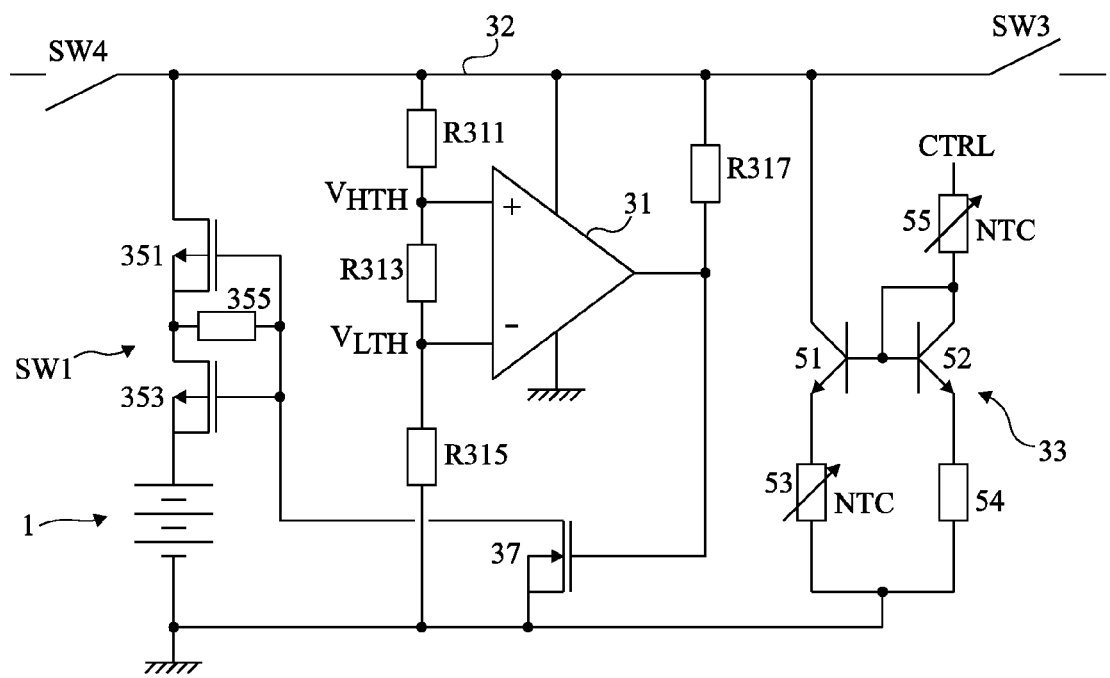
FIG. 7 shows a more detailed electric diagram of an embodiment of the protection device.

FIG. 7 is a more detailed electric diagram of an embodiment of the protection device. It integrates generator 33 of FIG. 5.

In the example of FIG. 7, the inputs of hysteresis comparator 31 are connected to the midpoint of a voltage dividing bridge with three resistors R311, R313, and R315, in series between terminal 32 and the ground. The output of comparator 31 is pulled to the battery voltage by a resistor R317 and is connected, via a transistor 37, to the control terminal of switch SW1. Switch SW1 is formed of two P-channel MOS transistors 351 and 353 in series having common gates and connected to the junction point of these transistors by a resistor 355.

Various embodiments have been described, various alterations and modifications are within the abilities of those skilled in the art. In particular, the sizing of the resistors of the protection device depends on the characteristics of the battery and may be modified. Further, the practical implementation of the present invention, and in particular the generation of control signal CTRL, is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for protecting a thin-layer battery, comprising the steps of:
   periodically operating the battery at a forced discharge current, which is a function of temperature; and
   disconnecting the battery as soon as the voltage thereacross reaches a threshold, said threshold being greater than a critical voltage of the battery for a maximum discharge current under a maximum temperature.

2. The method of claim 1, wherein the forced discharge current increases when the temperature increases.

3. The method of claim 1, wherein the periodic operation has a duty cycle smaller than 0.1%.

4. The method of claim 1, wherein the duration of each phase of forced discharge current operation is shorter than 50 ms.

5. The method of claim 1, wherein the period of the periodic operation is shorter than 10 minutes.

6. A device for protecting a thin-layer battery, comprising:
   a switchable load capable of periodically forcing the battery to operate at a forced discharge current, the forced discharge current being dependent on temperature; and
   a voltage comparator capable of comparing the voltage across the battery with a threshold, the threshold being greater than a critical voltage of the battery for a maximum discharge current under a maximum temperature.

7. The device of claim 6, wherein the switchable load is formed of a current source comprising at least one first resistive element with a negative temperature coefficient.

8. The device of claim 7, wherein the current source comprises:
   a first branch having a first bipolar transistor in series with a second resistive element; and
   a second branch having a second diode-assembled bipolar transistor, in series with a third resistive element, the second transistor being mirror-assembled on the first one and the first resistive element connecting the control terminals of the transistors to a terminal of application of a control signal.

9. The device of claim 7, wherein the comparator is a hysteresis comparator.

10. An electronic system comprising:
    a power source;
    a battery switchably coupled to the power source;
    a current sink switchably coupled to the battery and configured to sink from the battery a temperature-dependent current;
    a voltage comparator coupled to the battery and configured to compare a voltage output by the battery to a threshold voltage, the threshold voltage being derived from a critical voltage for a predetermined current discharge rate at a predetermined temperature; and
    a load switchably coupled to the battery.

11. The system of claim 10 wherein the battery is a thin-layer battery.

12. The system of claim 11 wherein the battery is a LiPON battery.

13. The system of claim 10 wherein the power comprises a source selected from the group consisting of solar generated power, wind generated power, heat collector generated power, vibration generated power, a battery recharge system, and an electrical distribution main.

14. The system of claim 10 wherein the load has a first operating mode wherein the load discharges the battery at a first current and a second operating mode wherein the load discharges the battery at a second, higher current.

15. The system of claim 14 wherein the first current is about 0.1 mA and the second current is about 5 mA.

16. The system of claim 10 further comprising a buffer capacitor configured to provide power to the load when the battery is discoupled from the load.

17. An electronic system comprising:
a battery;
means for coupling the battery to a power source;
means for operating the battery in a forced current discharge mode, wherein the forced current discharge mode is temperature dependent;
means for monitoring a battery voltage level; and
means for disconnecting the battery when the battery voltage reaches a threshold, said threshold being greater than a critical voltage of the battery for a maximum discharge current determined at maximum temperature.

18. The system of claim 17 further comprising the power source.

19. The system of claim 17 further comprising a load coupled to the battery.

20. The system of claim 19 further comprising a buffer capacitor and means for coupling the buffer capacitor to the load.

21. The system of claim 17 further comprising means for controlling the means for coupling the battery to a power source.

* * * * *